United States Patent
Bullock et al.

(10) Patent No.: US 6,697,618 B1
(45) Date of Patent: Feb. 24, 2004

(54) SYSTEM AND METHOD FOR DETECTING FAILURES IN A WIRELESS PHONE/MODEM JACK TO PREVENT TELEPHONE LINE SEIZURES

(75) Inventors: Scott R. Bullock, South Jordan, UT (US); David W. Thorson, Salt Lake City, UT (US)

(73) Assignee: Phonex Broadband Corporation, Midvale, UT (US)

( * ) Notice: Subject to any disclaimer, the term of this patent is extended or adjusted under 35 U.S.C. 154(b) by 0 days.

(21) Appl. No.: 09/552,928

(22) Filed: Apr. 19, 2000

(51) Int. Cl.[7] .................................................. H04Q 7/20
(52) U.S. Cl. ........................ 455/427; 455/445; 455/425
(58) Field of Search ................................ 455/423, 445, 455/421–422, 424–425, 435, 450, 817, 574, 8, 420, 448, 552–553, 67.1, 67.7; 379/22.01, 22.02, 27.07, 27.02, 27.03

(56) References Cited

U.S. PATENT DOCUMENTS

| | | | | |
|---|---|---|---|---|
| 3,912,882 A | * | 10/1975 | Beerbaum | 379/22.01 |
| 4,580,016 A | * | 4/1986 | Williamson | 379/31 |
| 5,134,708 A | * | 7/1992 | Marui et al. | 455/421 |
| 5,319,634 A | * | 6/1994 | Bartholomew et al. | 370/18 |
| 5,373,548 A | * | 12/1994 | McCarthy | 455/462 |
| 5,425,076 A | * | 6/1995 | Knippelmier | 379/27.04 |
| 5,428,673 A | * | 6/1995 | Nakagawa et al. | 379/100.15 |
| 5,496,494 A | * | 3/1996 | Burzio et al. | 8/137 |
| 5,530,737 A | * | 6/1996 | Bartholomew et al. | 379/62 |
| 5,539,803 A | * | 7/1996 | Bhat et al. | 379/21 |
| 5,661,725 A | * | 8/1997 | Buck et al. | 370/377 |
| 5,677,941 A | * | 10/1997 | Rice | 379/2 |
| 5,819,177 A | * | 10/1998 | Vucetic et al. | 455/425 |
| 5,926,755 A | * | 7/1999 | Ghisler | 455/414 |
| 5,953,346 A | * | 9/1999 | Luddy | 370/465 |
| 6,101,216 A | * | 8/2000 | Henderson et al. | 375/222 |
| 6,212,375 B1 | * | 4/2001 | Alanara | 455/423 |

* cited by examiner

*Primary Examiner*—Pablo N. Tran
(74) *Attorney, Agent, or Firm*—Lloyd W. Sadler

(57) ABSTRACT

A method and system which detects failures in communication between a base unit and an extension unit in a wireless communication system and which resets the system upon detecting such failures is described. A wireless communication system in this invention can use an RF over the air communication channel or an AC power line communication channel. In this method and system failures in the extension unit are detected and the base unit is reset, thereby permitting further use of the telephone communication link. A variety of embodiments are disclosed, including: transmitting a low frequency signal from the extension unit; transmitting a high frequency signal from the extension unit; periodically transmitting a status command signal from the extension unit; and detecting the signal strength of the transmitted signal from the extension unit in the base unit.

8 Claims, 5 Drawing Sheets

SYSTEM AND METHOD FOR DETECTING FAILURES IN A WIRELESS PHONE/MODEM JACK TO PREVENT TELEPHONE LINE SEIZURES

BACKGROUND OF THE INVENTION

1. Field of the Invention

This invention relates to wireless telephone communication between an extension module and a base module and which communicates over either a RF link or an AC powerline carrier link. More specifically, this invention relates to methods and systems for detecting failures, such as power failure, malfunctions, or other anomalies that would otherwise prevent further use of the telephone line until reset.

2. Description of Related Art

A variety of data communications failure addressing methods and systems have been proposed. Generally, these prior methods and systems do not specifically address the particular requirements of RF or AC powerline communication telephone systems.

For general background material, the reader is directed to the following U.S. patent documents, each of which is hereby incorporated by reference in its entirety for the material contained therein.

U.S. Pat. No. 5,469,494 describes a self-diagnostic system for checking all functions of a cellular-transceiver system having a cellular-interface unit, which interface unit couples a standard telephone set to a cellular transceiver.

U.S. Pat. No. 5,475,877 describes a mobile wireless set for supplying power to at least a part of a frequency synthesizer only during a period necessary and sufficient to stabilize the output of the frequency synthesizer so as to draw the frequency, and, in the other period, the output of the frequency synthesizer is held without supplying the power.

U.S. Pat. No. 5,544,222 describes a cellular digital packet data system that includes a mobile data base station configured to interface easily with an advanced mobile phone system.

U.S. Pat. No. 5,550,543 describes a method and apparatus for improving the performance of coding systems in the presence of frame erasures or lost packets.

U.S. Pat. No. 5,657,358 describes a toll quality terrestrial wireless digital multiple access terrestrial communication system having a base station in communication with telephone lines and with mobile subscriber stations.

U.S. Pat. No. 5,687,194 describes a system for the wireless transmission of multiple information signals utilizing digital time circuits between a base station and a plurality of subscriber stations.

U.S. Pat. No. 5,715,238 describes an apparatus and method that are provided for a data communication device, such as a modem, to detect the loss of a telecommunications channel connection, in the absence of other notification signals.

U.S. Pat. No. 5,715,296 describes an apparatus for interfacing at least one land-line telephone service, at least one wireless cellular-type telephone service, at least one cellular-type wireless telephone and at least one standard telephonic type communication device through standard building interior telephone cable.

U.S. Pat. No. 5,805,666 describes a method and apparatus for diagnosing personal communication system malfunctions.

U.S. Pat. No. 5,845,192 describes a wireless base station operating in a system in which wireless base stations are used to provide a link between a remote fixed part and a handset and method of operation of the same.

U.S. Pat. No. 5,859,894 describes a self-diagnostic system for a checking all functions of a cellular-transceiver system having a cellular-interface unit that couples a cellular transceiver to a standard telephone.

U.S. Pat. No. 5,873,037 describes a multiple mode, personal, wireless communications system, which exists within a radiotelephone network serving general customers and provides unique additional services to a select group of customers equipped with special handsets.

U.S. Pat. No. 5,886,997 describes a mobile apparatus for performing data communications and presenting a display in accordance with the status of the data communication.

U.S. Pat. No. 5,889,837 describes a system for testing a subscriber terminal of a wireless telecommunications system.

U.S. Pat. No. 5,905,963 describes a subscriber station monitor system that is provided for a subscriber station of a wireless telecommunications system.

U.S. Pat. No. 5,907,813 describes a method and apparatus for signal acquisition in a wireless telecommunication system having large transmission delay uncertainty.

U.S. Pat. No. 5,915,216 describes a wireless telecommunications system that includes a central terminal for transmitting and receiving radio frequency signals to and from a subscriber terminal.

U.S. Pat. No. 5,918,160 describes a subscriber station of a wireless telecommunications system that includes a transmitter/receiver for wireless communication with a central station and for processing signals for transmission and/or received signals.

U.S. Pat. No. 5,923,668 describes a wireless telecommunications system that includes a central terminal for transmitting and receiving radio frequency signals to and from a subscriber terminal.

U.S. Pat. No. 5,930,704 describes a subscriber station for the wireless connection of user telecommunications equipment to a remote central station of a wireless telecommunications system.

U.S. Pat. No. 5,940,753 describes a cellular communications system that has both satellite nodes and surface nodes for providing mobile cellular communications services for a plurality of mobile user units.

U.S. Pat. No. 5,946,616 describes an apparatus for interfacing at least one landline telephone service, at least one wireless cellular-type telephone service, at least one cellular-type wireless telephone and at least on standard telephonic type communication device through standard building interior telephone cable.

U.S. Pat. No. 5,960,358 describes a telephone system proving for talking operation after main power supply failure.

U.S. Pat. No. 5,960,367 describes an incoming calling system that securely notifies the user of the incoming call to a radio portable terminal of a mobile communication unit or the like without disturbing others and decreasing the probability of erroneous notification.

U.S. Pat. No. 5,966,428 describes a self-diagnostic system for checking all functions of a cellular-transceiver system.

U.S. Pat. No. 5,966,663 describes a data communications protocol that facilitates communications between a message entry device and a messaging center.

SUMMARY OF THE INVENTION

It is desirable to provide a method and system for detecting and resetting a communication malfunction between a base module and one or more extension modules in a wireless telephone communication system. Communication between a base module and one or more extension modules of a wireless telephone/modem jack extension system typically relies on carrier modulated signaling techniques to initiate and terminate off-hook conditions during a telephone connection. Once a call has been initiated or connection is achieved by the extension module, the base module remains in the off-hook (or connected) state until a command signal is received from the extension module that indicates the connection should be terminated. It is possible, during this off-hook state, for the extension module to become inoperative. The failure of the extension module may be caused by power failure, malfunction or other anomaly. Such a failure can allow the base module to remain connected to the telephone network, or central office, indefinitely preventing further use of the telephone line, by causing the base module to fail to receive the termination command (on-hook command). It is desirable to provide a method and system which ensures that the base module is effectively reset to terminate the connection, thereby permitting the telephone line to be used for used for another call.

Therefore, it is the general object of this invention to provide a method of detecting a line failure between a base module and an extension module in a wireless communication system.

It is a further object of this invention to provide a method of ending a failed connection between a base module and an extension module in a wireless communication system.

It is another object of this invention to provide a method detecting and resetting a wireless communication system, which identifies the continued connection between a base module and an extension module by providing a signal between the extension module to the base module, which when interrupted, indicates that the communication channel has been broken.

A still further object of this invention is to provide a method and system for detecting and resetting a wireless communication system, wherein a signal is provided that does not provide interference with normal voice and data communication.

These and other objects of this invention are achieved on a wireless telephone communication system, that consists of a base module and one or more extension modules, wherein the extension module transmits a signal to the base module, which when interrupted, indicates that the communication channel between the extension module and the base module is inoperable. These and other objects of the invention are readily apparent to those of ordinary skill in the art upon review of the following drawings, detailed description and claims.

BRIEF DESCRIPTION OF THE DRAWINGS

In order to show the manner that the above recited and other advantages and objects of the invention are obtained, a more particular description of the preferred embodiment of the invention, which is illustrated in the appended drawings, is described as follows. The reader should understand that the drawings depict only preferred and contemplated embodiments of the invention, and are not to be considered as limiting in scope. A brief description of the drawings is as follows.

DETAILED DESCRIPTION OF THE INVENTION

This invention is a method and system for the detection and reset of line connection failures between one or more extension units and a base unit in a wireless telephone/modem communication system. The preferred system is wireless in that it does not require for its operation the use of standard dedicated telephone wiring between the base and extension units. Instead of dedicated telephone wiring, the preferred system of this invention uses either an RF (over-the-air) link or an AC power line carrier link as the communication channel between the base and extension units.

Figure 1:
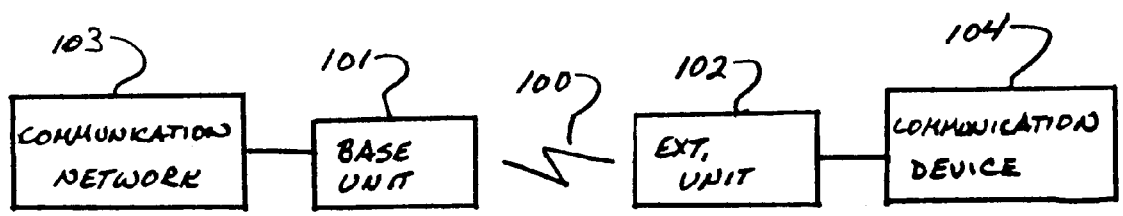
FIG. 1 shows the preferred system of this invention.

Referring now to the figures and in particular FIG. 1, which is a top-level block diagram of the preferred system of this invention. This preferred system consists of a base unit 101, an extension unit 102, communicating over a channel 100. The base unit 101, which provides the signal interface and conditioning between a communication network 103 and the channel 100, typically and preferably includes a line interface circuit, an oscillator, a transmitter, a receiver, a filter, a power supply and control logic. The communication network 103 can be a data, voice, video or any combination thereof, transmitted via standard telephone lines, television cable or other video signal source, cable fiber optic lines, a ground to satellite channel, RF, IF or other wireless and other like channels. The extension unit 102 provides the signal interface and conditioning between the channel 100 and the standard communication device 104. The extension unit 102 preferably includes a line interface circuit, an oscillator, a transmitter, a receiver, a filter, a power supply, and a micro controller. The standard communication device 104 connected to the extension unit 102, typically is a telephone device, a television, a computer modem, a facsimile machine, or other similar communication devices.

Figure 2:
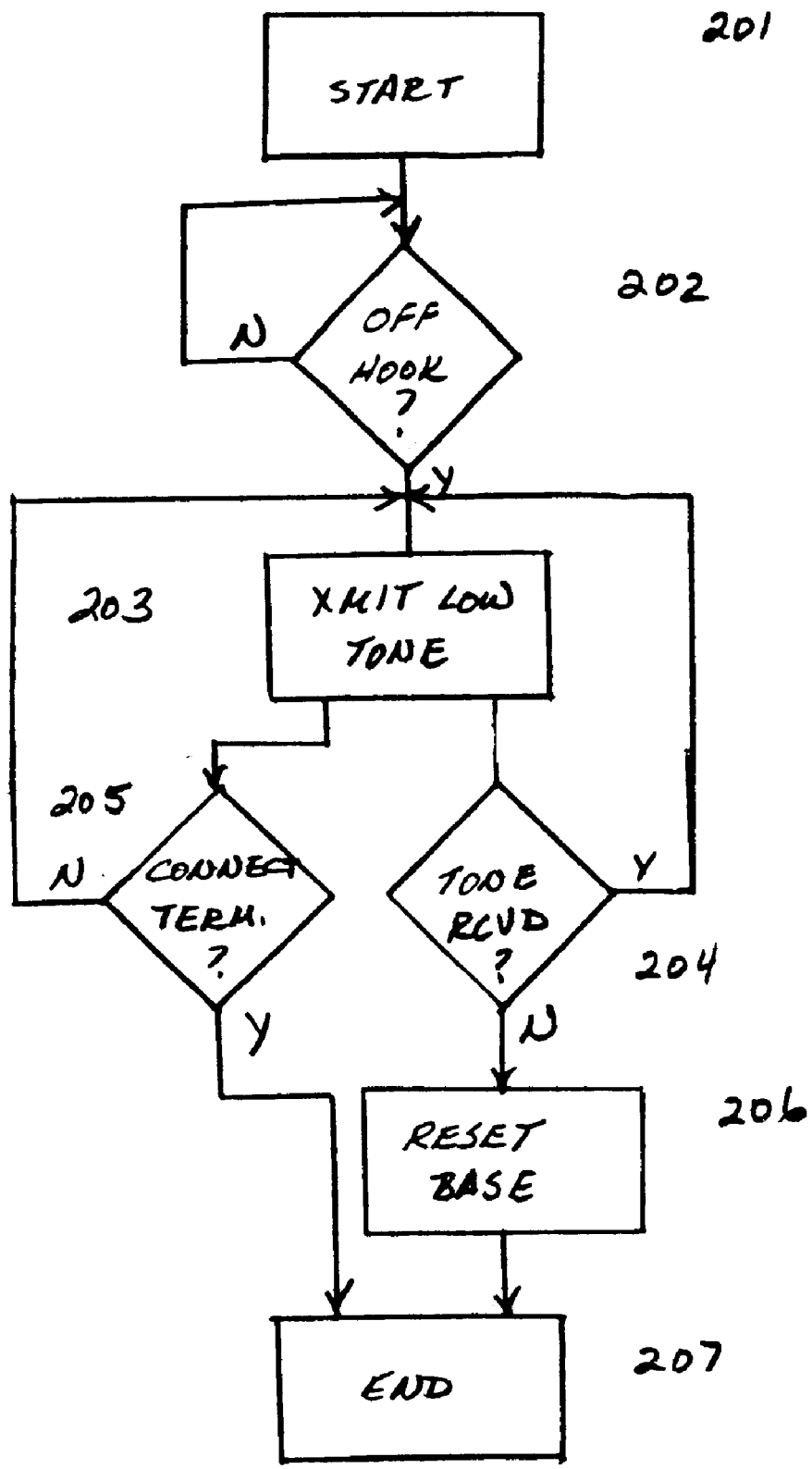
FIG. 2 shows the steps of a first method of this invention.

FIG. 2 shows the preferred steps of the method of this invention. The method starts 201 with the extension unit 102 being placed in use. A first test 202 is made as to whether the extension unit 102 is off-hook. If the extension unit 102 is not off-hook, the first test 202 is repeated. If the extension unit 102 is off-hook, then a continuous low frequency tone is transmitted 203 and detected by the base unit 101. The tone in this embodiment of the invention is low enough in frequency and level so as not to interfere with normal voice and data communications taking place over the wireless connection. Typically, the preferred tone frequency is 1 to 5 Hz, although in alternative embodiments, much higher frequencies, and perhaps lower frequencies, are envisioned. The status of the connection and tone are monitored. A connection termination test 205 is made to determine if the connection between the base unit 101 and the extension unit 102 has been terminated normally and a tone received test 204 is made to determine if the base unit 101 is receiving the tone transmitted by the extension unit 102. The tone continues to be transmitted if so long as the tone is received and the connection has not been terminated. If the tone is not received the base unit 101 is reset 206. If the connection is terminated or once the base unit 101 had been reset, the process ends 207.

Figure 3:
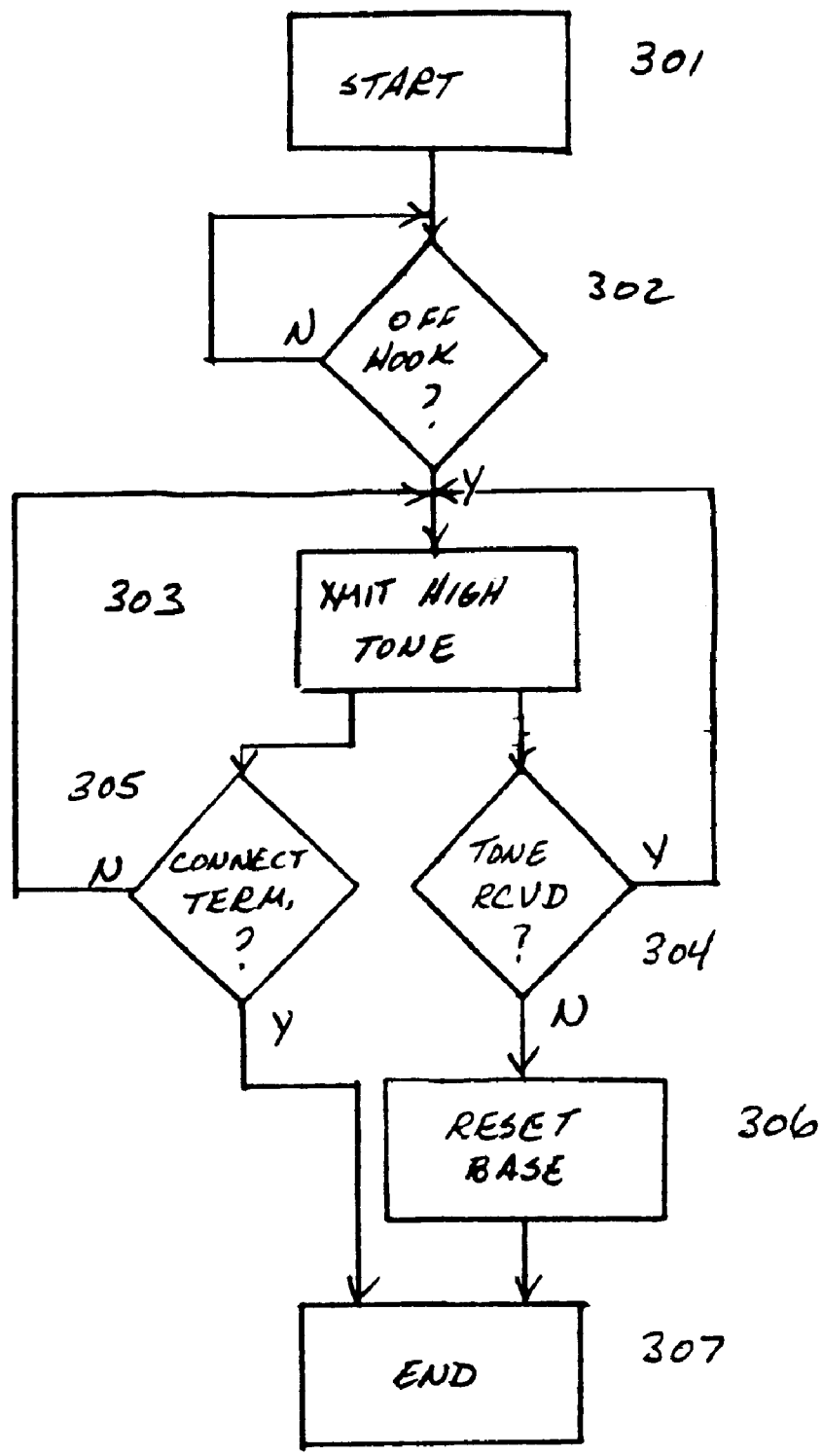
FIG. 3 shows the steps of a second method of an alternative mode of this invention.

FIG. 3 shows the preferred steps of a second embodiment of this invention. In the embodiment the process starts 301 by placing the extension unit 102 in use. A test 302 is made to determine if the extension unit 102 is off-hook. If the extension unit 102 not off-hook, the test 302 is repeated. If the extension unit 102 is off-hook then a high frequency tone is transmitted by the extension unit 102. The transmitted tone of this embodiment is higher in frequency than that of the first embodiment described above and in FIG. 2. A test is made 304 to determine if the connection has been terminated between the extension unit 102 and the base unit 101. A test is also made 304 to determine if the tone is received by the base unit 101. If both the connection has not been terminated and the tone is being received, the tone continues to be transmitted. If the tone is not received, then the base unit 101 is reset 306 and the process ends 307. If the connection is terminated the process ends 307.

Figure 4:
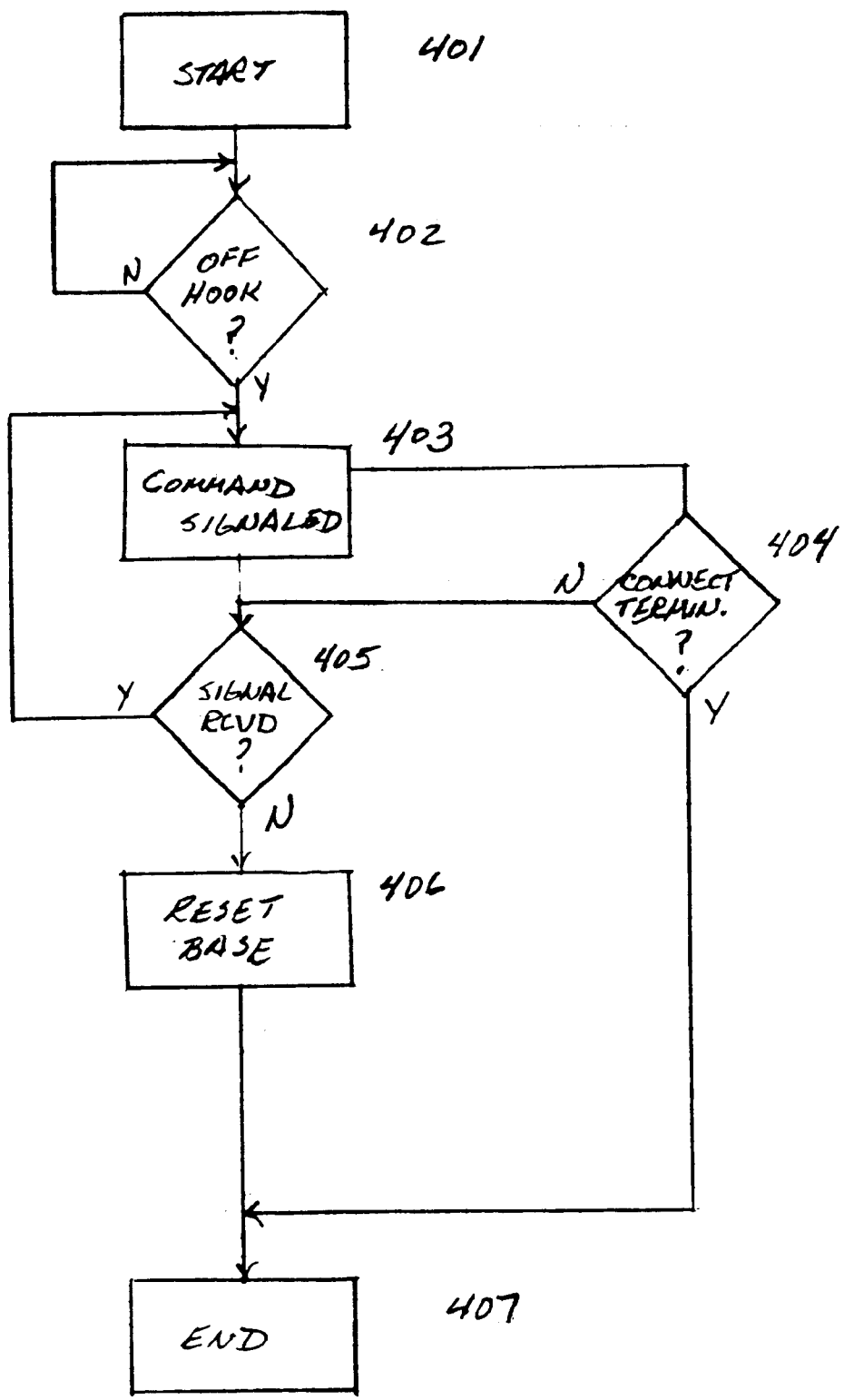
FIG. 4 shows the steps of a third method of another alternative mode of this invention.

FIG. 4 shows the steps of a third alternative embodiment of the process steps of this invention. In this embodiment, the process starts 401 when the extension unit 102 is placed in use. A test 402 is made to determine if the extension unit 102 is off-hook. If the extension unit 102 is not off-hook the test 402 is repeated. If the extension unit 102 is off-hook, a command is signaled 403 to the base unit 101. This command signal is periodically repeated at regular intervals through out the course of the connection between the base unit 101 and the extension unit 102. These commands are of a very short duration to minimize interference with the voice or data communication between the base unit 101 and the extension unit 102. In the preferred embodiment of this alternative, the period of time between successive command transmissions are about every two minutes, although this period of time may be substantially different without departing from the concept of this invention. After each command transmission a test 404 is made in the base unit 101 to determine if the connection has been terminated. If the connection has been terminated, the processes ends 407. If the connection has not been terminated, a test 405 is made to determine if the command was received. If the command was received by the base unit 101, the base unit 101 remains connected and waits for another command for another time period. If the signal is not received, by the base unit 101, the base unit 101 is reset 406 and the process ends 407.

Figure 5:
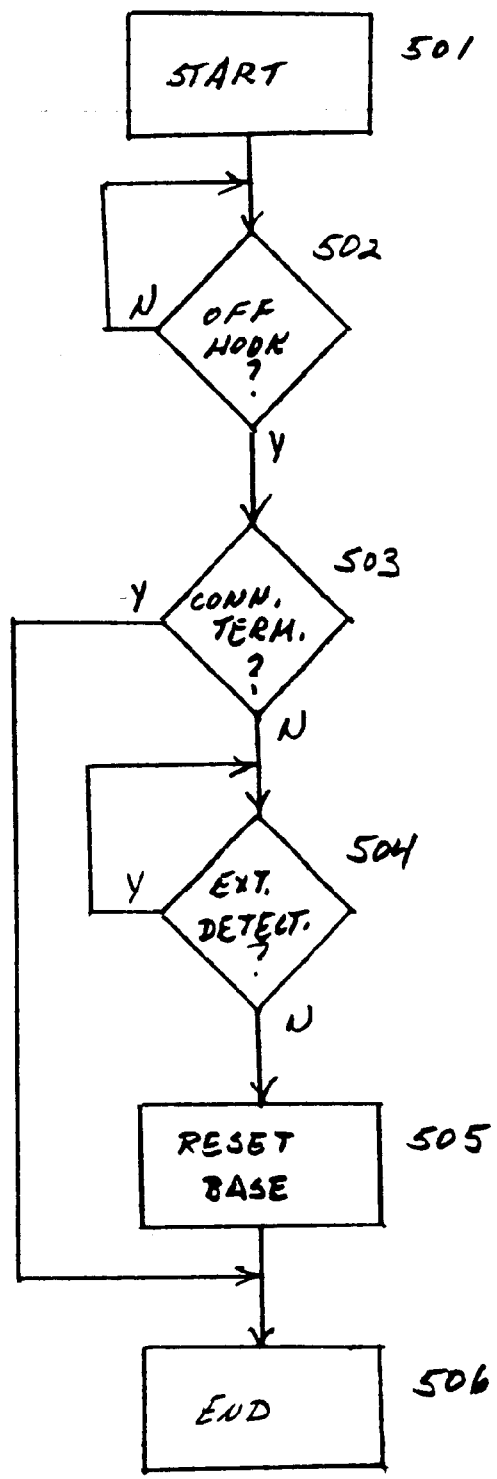
FIG. 5 shows the steps of a fourth method of a further alternative mode of this invention.

FIG. 5 shows the preferred steps of another alternative embodiment of this invention. In this embodiment, the process starts 501 with the extension unit 102 being placed in service. A test 502 is made to determine if the extension unit 102 is off-hook. If the extension unit 102 is not off-hook then the test 502 is repeated. If the extension unit 102 is off-hook, a test 503 is made to determine if the connection has been terminated. If the connection has been terminated, then the process ends. If the connection has not been terminated, then a test 504 is made to determine if the base unit 101 detected the RF signal strength of the extension unit 102. Typically, this detection 504 is accomplished by using the RSSI output of a standard receiver circuit, or other means for detecting the signal strength or amplitude. Should the extension unit 102 become inoperative, the base unit 101 will detect the absence of the RF carrier strength, at which point the base is reset 505 and the operation proceeds to end 506.

The foregoing description is of several preferred embodiments of the invention and has been presented for the purposes of illustration and to describe the best modes of the invention currently known to the inventors. It is not intended to be exhaustive or to limit the invention to the precise steps, form, or choice of components disclosed. Obvious modifications and/or variations are possible and foreseeable in light of the above teachings. This embodiment of the invention was chosen and is described to provide the best illustration of the principles of the invention and its practical application and to thereby enable one of ordinary skill in the art to utilize the invention in various embodiments and with various modifications as are suited to the particular use contemplated. All such modifications and variations are within the scope of the invention as determined by the appended claims when they are interpreted in accordance with the breadth to which they are fairly, legally and equitably entitled.

We claim:

1. A system for detecting failures in a wireless communication system, comprising:
   (A) a communication network;
   (B) a base unit connected to said communication network;
   (C) an extension unit, having a signal transmitter for sending a status signal to said base unit, wherein said status signal is a continuous or periodic tone which continues to be transmitted between said extension unit and said base unit so long as a connection between said extension unit and said base unit is maintained and wherein said base unit is reset when said status signal ceases to be transmitted between said extension unit and said base unit and wherein said continuous or periodic tone is set to a frequency and level low enough so as to not interfere with normal voice and data communications;
   (D) a communication device connected to said extension unit; and
   (E) a communication channel connecting said base unit to said extension unit.

2. A system for detecting failures in a wireless communication system, as recited in claim 1, wherein said status signal is a low frequency tone.

3. A system for detecting failures in a wireless communication system, as recited in claim 1, wherein said status signal is a high frequency tone.

4. A system for detecting failures in a wireless communication system, as recited in claim 1, wherein said status signal is a periodic command signal.

5. A system for detecting failures in a wireless communication system, as recited in claim 1, wherein said status signal is detected in the signal strength of data transmitted by said extension unit.

6. A system for detecting failures in a wireless communication system, as recited in claim 1, wherein said communication channel is an AC power line channel.

7. A system for detecting failures in a wireless communication system, as recited in claim 1, wherein said communication channel is an RF over the air channel.

8. A system for detecting failures in a wireless communication system, as recited in claim 1, wherein said tone has a frequency of less than or equal to 5 Hz.

* * * * *

UNITED STATES PATENT AND TRADEMARK OFFICE
CERTIFICATE OF CORRECTION

| | | |
|---|---|---|
| PATENT NO. | : 6,697,618 B1 | |
| APPLICATION NO. | : 09/552928 | |
| DATED | : February 24, 2004 | |
| INVENTOR(S) | : Bullock et al. | |

Page 1 of 1

It is certified that error appears in the above-identified patent and that said Letters Patent is hereby corrected as shown below:

Title page, item (56), under "U.S. Patent Documents", in Column 2, Line 12, below "6,212,375 B1 *   4/2001   Alanara ............... 455/423" insert

| | | | |
|---|---|---|---|
| 5,469,494 | 11/1995 | Ortiz Perez et al. ................. | 375/27 |
| 5,475,877 | 12/1995 | Adachi ................................. | 455/343 |
| 5,544,222 | 8/1996 | Robinson et al. .................. | 379/58 |
| 5,550,543 | 8/1996 | Chen et al. ........................... | 341/94 |
| 5,657,358 | 8/1997 | Panech et al. ........................ | 375/356 |
| 5,687,194 | 11/1997 | Paneth et.al. ........................ | 375/283 |
| 5,715,238 | 2/1998 | Hall, Jr. et al. ..................... | 370/242 |
| 5,715,296 | 2/1998 | Schornack et al. ................. | 379/58 |
| 5,805,666 | 9/1998 | Ishuzuka et al. .................... | 379/1 |
| 5,845,192 | 12/1998 | Saunders ............................ | 455/11.1 |
| 5,859,894 | 1/1999 | Ortez Perez et al. ............... | 379/27 |
| 5,873,037 | 2/1999 | Zicker et al. ........................ | 455/450 |
| 5,886,997 | 3/1999 | Shimada et al. .................... | 370/527 |
| 5,889,837 | 3/1999 | Sands ................................... | 379/27 |
| 5,905,963 | 5/1999 | Lysejko ................................ | 455/557 |
| 5,907,813 | 5/1999 | Johnson, Jr. et al. ............... | 455/502 |
| 5,915,216 | 6/1999 | Lysejko ............................... | 455/422 |
| 5,918,160 | 6/1999 | Lysejko et al. ..................... | 455/57 |
| 5,923,668 | 7/1999 | Lysejko ............................... | 370/515 |
| 5,930,704 | 7/1999 | Kay ...................................... | 455/419 |
| 5,940,753 | 8/1999 | Mallinckrodt ........................ | 455/422 |
| 5,946,616 | 8/1999 | Schornack et al. .................. | 455/422 |
| 5,960,358 | 9/1999 | Fujikura et al. ...................... | 455/462 |
| 5,960,367 | 9/1999 | Kita ...................................... | 455/567 |
| 5,966,428 | 10/1999 | Ortiz Perez et al. .................. | 379/27 |
| 5,966,663 | 10/1999 | Gleason ............................... | 455/466 |

--.

Signed and Sealed this

Twenty-fifth Day of June, 2013

Teresa Stanek Rea
*Acting Director of the United States Patent and Trademark Office*